United States Patent
Gray et al.

(10) Patent No.: US 10,450,235 B2
(45) Date of Patent: Oct. 22, 2019

(54) METHOD OF PRODUCING AN INTERNAL CAVITY IN A CERAMIC MATRIX COMPOSITE AND MANDREL THEREFOR

(71) Applicant: General Electric Company, Schenectady, NY (US)

(72) Inventors: Paul Edward Gray, North East, MD (US); Herbert Chidsey Roberts, III, Simpsonville, SC (US); Glenn Curtis Taxacher, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 767 days.

(21) Appl. No.: 13/780,306

(22) Filed: Feb. 28, 2013

(65) Prior Publication Data
US 2014/0072736 A1    Mar. 13, 2014

Related U.S. Application Data

(60) Provisional application No. 61/639,617, filed on Apr. 27, 2012.

(51) Int. Cl.
| | | |
|---|---|---|
| *C04B 35/573* | (2006.01) | |
| *B28B 1/54* | (2006.01) | |
| *B29D 22/00* | (2006.01) | |
| *B33Y 80/00* | (2015.01) | |

(Continued)

(52) U.S. Cl.
CPC .............. *C04B 35/573* (2013.01); *B28B 1/54* (2013.01); *B29D 22/00* (2013.01); *B33Y 80/00* (2014.12); *C04B 2235/6026* (2013.01); *C04B 2235/6028* (2013.01); *F01D 5/187* (2013.01);

(Continued)

(58) Field of Classification Search
CPC ...... C04B 35/573; C04B 35/653; C04B 35/65
See application file for complete search history.

(56) References Cited

U.S. PATENT DOCUMENTS

| | | | |
|---|---|---|---|
| 3,907,949 A | 9/1975 | Carlson | |
| 4,040,849 A * | 8/1977 | Greskovich | ........... C04B 35/591 |
| | | | 257/E23.008 |
| 4,615,855 A | 10/1986 | Orlowski et al. | |

(Continued)

FOREIGN PATENT DOCUMENTS

| | | |
|---|---|---|
| CN | 1131590 A | 9/1996 |
| CN | 101224497 A | 7/2008 |

(Continued)

OTHER PUBLICATIONS

Breede, F. et al., Mechanical Properties and microstructures of C/C—SiC composite plates by wet filament winding technique, Sonderforschungbereich/Transregio 40—Annual Report 2010, pp. 1-10. (Year: 2010).*

(Continued)

*Primary Examiner* — Matthew J Daniels
(74) *Attorney, Agent, or Firm* — Dority & Manning, P.A.

(57) ABSTRACT

A process for producing an internal cavity in a CMC article and mandrels used therewith. The process entails incorporating a mandrel made of a material that is substantially absorbed during thermal treatment of a preform to form the CMC article. The mandrel material is preferably reactive with one or more constituents of the CMC preform during the thermal treatment. The material is preferably silicon or a silicon alloy.

13 Claims, 1 Drawing Sheet

(51) Int. Cl.
  *F01D 5/18* (2006.01)
  *F01D 5/28* (2006.01)
(52) U.S. Cl.
  CPC .............. *F01D 5/282* (2013.01); *F01D 5/284* (2013.01); *F05D 2300/6033* (2013.01); *Y10T 428/131* (2015.01)

(56) References Cited

U.S. PATENT DOCUMENTS

| | | | |
|---|---|---|---|
| 5,015,540 | A | 5/1991 | Borom et al. |
| 5,066,454 | A | 11/1991 | Hanson |
| 5,177,039 | A | 1/1993 | Allaire et al. |
| 5,330,854 | A | 7/1994 | Singh et al. |
| 5,336,350 | A | 8/1994 | Singh |
| 5,628,938 | A | 5/1997 | Sangeeta et al. |
| 5,910,095 | A | 6/1999 | Strasser et al. |
| 6,001,436 | A | 12/1999 | Strasser et al. |
| 6,024,898 | A | 2/2000 | Steibel et al. |
| 6,258,737 | B1 | 7/2001 | Steibel et al. |
| 6,280,550 | B1 | 8/2001 | Steibel et al. |
| 6,328,834 | B1* | 12/2001 | Rebstock ............ B29C 43/006 156/89.26 |
| 6,403,158 | B1 | 6/2002 | Corman |
| 6,503,441 | B2 | 1/2003 | Corman et al. |
| 6,627,019 | B2 | 9/2003 | Jarmon et al. |
| 7,600,979 | B2 | 10/2009 | Steibel et al. |
| 7,837,914 | B2 | 11/2010 | Kostar et al. |
| 7,926,182 | B2 | 4/2011 | Hou |
| 9,050,769 | B2 | 6/2015 | Monaghan et al. |
| 2003/0059577 | A1* | 3/2003 | Morrison ................ B32B 3/18 428/166 |
| 2003/0129375 | A1* | 7/2003 | Bauer .................. C04B 35/565 428/293.4 |
| 2004/0067316 | A1 | 4/2004 | Gray et al. |
| 2005/0056020 | A1 | 3/2005 | Hadder |
| 2005/0118392 | A1 | 6/2005 | Millard et al. |
| 2006/0283014 | A1 | 12/2006 | Subramanian et al. |
| 2007/0096371 | A1 | 5/2007 | McGuigan et al. |
| 2008/0199661 | A1 | 8/2008 | Keller et al. |
| 2010/0255235 | A1 | 10/2010 | Ilzhoefer et al. |
| 2010/0279845 | A1 | 11/2010 | Kebbede et al. |
| 2013/0017094 | A1 | 1/2013 | Coupe et al. |
| 2013/0017409 | A1 | 1/2013 | Schoenecker et al. |
| 2014/0072736 | A1 | 3/2014 | Gray et al. |

FOREIGN PATENT DOCUMENTS

| | | |
|---|---|---|
| CN | 102527601 A | 7/2012 |
| CN | 102741043 A | 10/2012 |
| EP | 0240190 A2 | 10/1987 |
| EP | 1262468 A1 | 12/2002 |
| EP | 2578553 A2 | 4/2013 |
| EP | 2617695 A2 | 7/2013 |
| JP | 62227603 A | 10/1987 |
| JP | 62256605 A | 11/1987 |
| JP | 01198343 A | 8/1989 |
| JP | 07195147 A | 8/1995 |
| JP | 2011504823 A | 2/2011 |

OTHER PUBLICATIONS

EP Search Report and Opinion dated Sep. 10, 2013 from corresponding EP Appiication No. 13165242.2.
EP Search Report and Opinion dated Sep. 13, 2013 from corresponding EP Application No. 13165241.4.
Unofficial English translation of Chinese Office Action issued in connection with corresponding CN Application No. 201310149114.8 dated Nov. 4, 2015.
U.S. Appl. No. 13/780,584, filed Feb. 28, 2013, Paul Edward Gray et al.
U.S. App. No. 14/893,702, filed Nov. 24, 2015, Michael Ray Tuertscher et al.
Non-Final Rejection towards U.S. Appl. No. 13/780,584 dated Nov. 13, 2017.
Unofficial English Translation of Japanese Office Action issued in connection with corresponding JP Application No. 2013089882 dated Jun. 6, 2017.
Unofficial English Translation of Japanese Office Action issued in connection with corresponding JP Application No. 2013089883 dated Jul. 4, 2017.
PCT Search Report and Written Opinion issued in connection with related PCT Application No. PCT/US2014/035088 dated Jul. 7, 2014.
Chinese Office Action issued in connection with related CN Application No. 201480030986.5 dated May 6, 2016.

* cited by examiner

METHOD OF PRODUCING AN INTERNAL CAVITY IN A CERAMIC MATRIX COMPOSITE AND MANDREL THEREFOR

CROSS REFERENCE TO RELATED APPLICATIONS

This application claims the benefit of U.S. Provisional Application No. 61/639,617, filed Apr. 27, 2012, the contents of which are incorporated herein by reference.

STATEMENT REGARDING FEDERALLY SPONSORED RESEARCH

This invention was made with government support under Contract No. DE-FC26-05NT42643 awarded by Department of Energy. The Government has certain rights in this invention.

BACKGROUND OF THE INVENTION

The present invention generally relates to ceramic matrix composite (CMC) articles and processes for their production.

CMC materials have become of particular interest for use in turbomachinery as higher operating temperatures are sought to increase their efficiency. CMC materials, and particularly those proposed for gas turbine engine applications, typically comprise a ceramic fiber reinforcement material embedded in a ceramic matrix material. The reinforcement material serves as the load-bearing constituent of the CMC, and the ceramic matrix protects the reinforcement material, maintains the orientation of its fibers, and serves to dissipate loads to the reinforcement material.

Of particular interest to high-temperature applications are silicon-based composites, such as silicon carbide (SiC) as the matrix and/or reinforcement material. Notable examples of SiC/Si—SiC (fiber/matrix) CMC materials and processes are disclosed in commonly-assigned U.S. Pat. Nos. 5,015,540, 5,330,854, 5,336,350, 5,628,938, 6,024,898, 6,258,737, 6,403,158, and 6,503,441, and commonly-assigned U.S. Patent Application Publication No. 2004/0067316. One such process is known as "prepreg" melt-infiltration (MI), which in general terms entails the fabrication of CMCs using multiple prepreg layers, each in the form of a tape-like structure comprising the desired reinforcement material, a precursor of the CMC matrix material, binders, and other possible ingredients. The prepregs must undergo processing (including curing, also known as firing) to convert the precursor to the desired ceramic. Multiple plies of prepregs are stacked and debulked to form a laminate preform, a process referred to as "lay-up." Following lay-up, the laminate preform will typically undergo debulking and curing while subjected to applied pressure and an elevated temperature, such as in an autoclave. The melt-infiltration process generally entails heating the laminate preform in a vacuum or an inert atmosphere to decompose (burnout) the binders and produce a porous preform ready for melt infiltration, after which the preform can be melt infiltrated with, for example, molten silicon supplied externally to the preform. The molten silicon infiltrates into the porosity and preferably reacts with constituents (for example, a carbon source) within the matrix to form a silicon-based ceramic (for example, silicon carbide) that fills the porosity to yield the desired CMC component.

CMC articles having inner cavities are desirable or necessary for some applications, including but not limited to cavities that define cooling slots/holes and complex cooling passages within airfoil components, as well as cavities intended to generally achieve weight reduction. Inner cavities can be produced in a CMC article by forming the laminate preform around a mandrel. However, the mandrels must be removed prior to melt infiltration. Mandrels that remain solid during burnout must be physically removed, which can be impossible if the desired cavity has twists or tapers. FIG. 1 schematically shows an example where a conventional steel mandrel 30 is intended to form a subsequent cavity in a section 20 of a laminate preform 10. The steel mandrel 30 cannot be removed from the preform 10 due to its being captured by a shoulder 22 defined by plies at one end of the preform 10. To address this issue, polymeric mandrels have been proposed that are formed of fugitive resins. Fugitive polymeric resins, in the context of this description, are typically hydro-carbon based solids which upon heating to a sufficiently high temperature, typically 400-800° C., volatilize leaving little or no carbon residue. Notable examples of fugitive resins include polymethyl methacrylate and ply-vinyl alcohol. However, these resins have thermal expansion coefficients that may be five to ten times greater than the material of the CMC preform. The higher expansion coefficient of the fugitive resins can cause the CMC preform to distort during heating to decompose the binder resins. During burnout, the fugitive resins melt and the molten resin must be removed from the resultant cavity within the interior of the CMC article. Some of the molten resin may form a carbonaceous coating inside the cavity which, when reacted with silicon during subsequent melt infiltration, can alter the cavity dimensions. When using fugitive resins with larger-size CMC components, the amount of gases which must escape from or through the preform as the polymeric mandrel decomposes also increases. This necessitates using slower pyrolysis cycles which increases processing cycle time for the CMC components.

Accordingly, there is a need for improved methods capable of forming internal cavities within CMC articles.

BRIEF DESCRIPTION OF THE INVENTION

The present invention provides a method capable of forming an internal cavity within a CMC article through the use of a mandrel that can be advantageously reactive to constituents of the CMC material so as to be incorporated into the CMC article.

A first aspect of the invention is a method of creating an internal cavity in a CMC article by the use of a reactive mandrel to achieve a cavity in a CMC article. The mandrel material wets the CMC preform and reacts with the preform and/or is absorbed into the preform during a thermal treatment. In a preferred embodiment of the invention, a reactive mandrel is made of elemental silicon or a silicon alloy, which melts during melt infiltration to provide a source of silicon for the melt infiltration process and/or is mostly eliminated from the resultant hollow inner cavity.

A second aspect of the invention is a mandrel suitable for the purpose of creating an internal cavity in a CMC article. In a preferred embodiment of the invention, the mandrel comprises silicon or an alloy of silicon.

A third aspect of the invention is to create a CMC article with a desired internal cavity through a method of using a mandrel made of a material that is chemically reactive with a constituent of the CMC preform and/or absorbable by the CMC preform, and melt-infiltrating the preform wherein the mandrel material wets the CMC preform, reacts with a constituent of the perform and is substantially absorbed.

A technical effect of the invention is that, because the mandrel is melted to react with or be absorbed into a CMC preform, an internal cavity in a CMC article can be produced without undesired distortion or deformation of the CMC preform used to produce the article. Further, long processing times typically needed when fugitive resins are used for producing a cavity can be eliminated.

Another technical effect of the invention is that cavities of desired and complex shapes can be achieved in a CMC article for purposes of weight reduction and/or cooling purposes without difficulties typically associated with the removal of non-reactive metallic mandrels or problems associated with elimination of fugitive resins used in non-reactive mandrels.

Other aspects and advantages of this invention will be further appreciated from the following detailed description

DETAILED DESCRIPTION OF THE INVENTION

Figure 3:
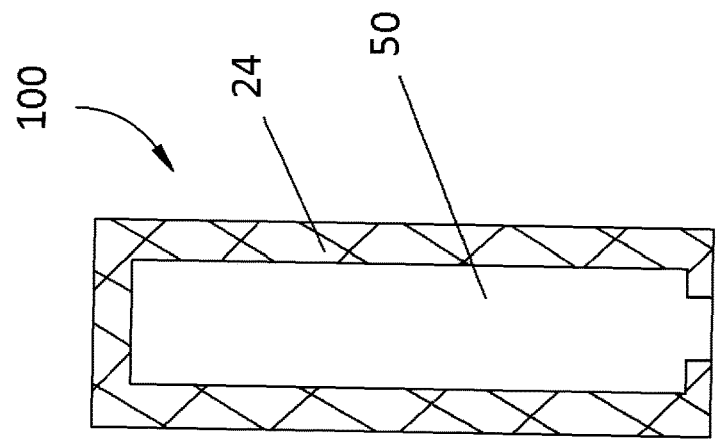
FIG. 3 schematically represents a cross-section CMC article with a cavity achieved through the use of a reactive or otherwise absorbable mandrel.

This invention is directed to the creation of internal cavities within CMC articles, for example, to create cooling channels, achieve weight reduction and/or any other desired purpose. Conventional processes of creating such cavities have utilized mandrels formed of materials such as fugitive resins or non-reactive metals. Both of these methods have several limitations and disadvantages as described previously. The current invention addresses difficulties and disadvantages of the prior art by methods that incorporate use of mandrels made of materials that can be absorbed by and preferably reacted with a CMC preform used in the manufacture of a CMC article. In particular, preferred materials for mandrels employed with the invention are molten at a thermal treatment temperature of the preform, for example, during melt infiltration performed after a curing (firing) step carried out on a laminate preform to form a porous preform.

Preferred characteristics for materials for mandrels that can be advantageously eliminated by absorption and reaction with a CMC preform include the ability to be formed into a suitable shape for a mandrel, wet the CMC preform at melt infiltration temperatures, react with constituents of the CMC preform to form reaction products that are advantageous or at least not detrimental to the final article, and be absorbed nearly completely by the CMC preform either by reaction, by infiltration, or both.

Preferred materials for such mandrels are silicon and alloys of silicon. Sintered silicon-containing mandrels can be manufactured by, for example, damp pressing and sintering a powder material in large lots to minimize costs. Elemental silicon and silicon alloy powder materials are capable of exhibiting nearly zero shrinkage during sintering, yet exhibit sufficient strength to survive handling and autoclave curing pressures. Furthermore, a sintered silicon-containing mandrel can remain within the preform during the entire process sequence leading up to melt infiltration and exhibit thermal expansion characteristics similar to those of the CMC preform. While silicon or silicon-based materials can be well suited as the material of a mandrel used to create a cavity within a SiC-based CMC articles, it is foreseeable that different mandrel materials with different reaction and/or infiltration characteristics may exist or be developed and would be compatible with the chemistry of a CMC article.

A mandrel of this invention may be formed entirely of elemental silicon or a silicon alloy. Alternatively, sintered silicon-containing mandrels may also contain fugitive binders, such as acrylic resins or polyvinyl alcohol. A small amount of water or alcohol may be added to render the initial powder mixture damp and suitable for pressing in a mold. The powder mixture can be pressed under sufficient pressure to yield a desired freestanding shape, herein after called a core. In a preferred, non-limiting method, this core can be dried and then loaded into a vacuum furnace to undergo sintering, for example, at a temperature of about 1385+/−10° C. for about ninety minutes, to render it free-standing and able to survive being covered with ceramic composite precursor prepreg plies to yield a laminate CMC preform. Since the core shrinks during the sintering operation, allowance must be made by oversizing the original pressed core shape. The sintered shape is then removed from the vacuum furnace. One could also envision using a 3-dimensional (3-D) printer with silicon powder in a printing ink suitable for use with 3-D printers as a way to make a mandrel with fine features. A core made with silicon ink can be sintered as described above.

The mandrel is preferably coated to yield a substantially impervious surface capable of preventing any resins of the CMC preform from penetrating the sintered silicon mandrel during lay-up and curing of the laminate CMC preform. An impervious surface is particularly desirable if preform resins are of the type that would form a silicon compound, such as silicon carbide, and could therefore react with the silicon in the mandrel and possibly cause the inner cavity dimensions formed by the mandrel to be altered. Suitable coating materials for this purpose include, but are not limited to, acrylic spray resins, such as poly methyl methacrylate.

Figure 2:
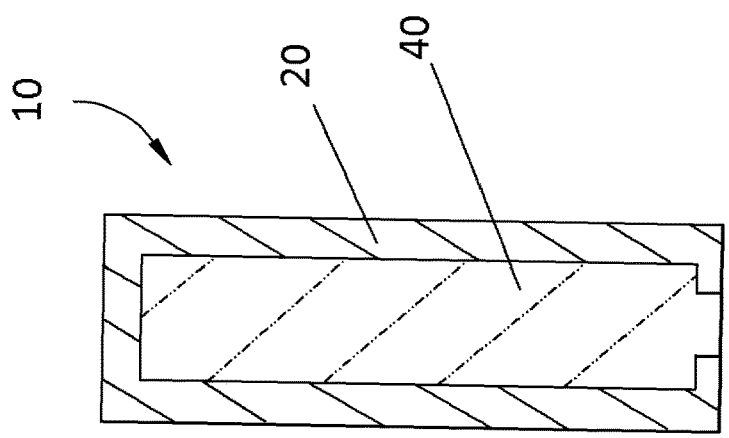
FIG. 2 schematically a cross-section of a CMC preform with a reactive or otherwise absorbable mandrel.
Figure 1:
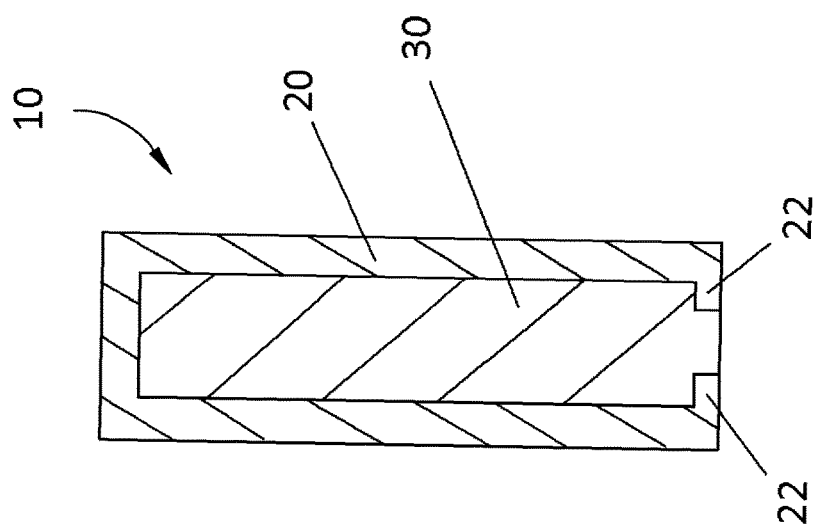
FIG. 1 schematically represents a cross-section of a CMC preform with a non-reactive mandrel.

Ceramic composite precursor prepreg plies may then be wrapped over the sintered mandrel shape and cured in an autoclave or matched-plate die set. After curing, the preform and sintered mandrel may be heated to above 500° C. to remove the resinous components to yield a porous preform. The porous preform plus the sintered silicon core and any additional silicon can then be further heated in another vacuum or atmosphere furnace to cause the silicon to melt and infiltrate the porous preform. FIG. 2 schematically represents a sintered silicon mandrel 40 incorporated into a section 20 of a laminate preform 10. During a melt infiltration process or other thermal treatment of the preform 10, the silicon mandrel 40 melts and the resulting molten material wets the CMC preform 10, infiltrates into the preform 10 and chemically reacts with constituents of the CMC preform to form, for example, SiC or another silicon compound. Any unreacted silicon may simply remain infiltrated. FIG. 3 schematically represents a cavity 50 formed in the section 20 of the fully infiltrated CMC preform 10 indicated in FIG. 3 as the final CMC article 100.

It will be noted by those skilled in the art that use of a reactive mandrel material can result in unconsumed mandrel material. This condition can be avoided by proper tuning of the processing conditions. The presence of unconsumed mandrel material within the CMC article may not have any deleterious effects except in cases wherein the weight of the CMC article has to be closely controlled. In such cases complete consumption of the mandrel material can be ensured through additional processing steps as required. Multiple cavities can be formed in a CMC preform utilizing multiple mandrels and following the methods described herein. A single cavity or multiple cavities formed in a CMC article can be utilized for purposes of weight reduction, and/or as cooling slots/holes.

It is foreseeable that other materials could be used that wet the CMC preform 10 during a melt-infiltration process and are completely absorbed through penetration into the CMC preform 10, but would not necessarily react as silicon does with the CMC preform 10. However, in such cases one needs to ensure that such materials do not contribute to any ill effects either due to thermal expansion characteristics or other physical properties. Preferred embodiments of the invention are thus directed to the utilization of silicon-containing materials such that no extraneous materials are used or formed other than those of conventional CMC melt-infiltration processes, resulting in a SiC-based CMC article. It is to be further noted that the methods disclosed may be used to create internal cavities in CMC articles based on silicon compounds other than SiC, such as SiN as anon-limiting example.

In view of the above, it can be seen that a significant advantage of this invention is that it solves problems associated with forming hollow internal cavities within CMC articles without having to physically remove a mandrel from the resulting cavity after curing, and without introducing potentially deleterious materials into the final CMC article.

While the invention has been described in terms of specific embodiments, it is apparent that other forms could be adopted by one skilled in the art. Accordingly, it should be understood that the invention is not limited to the specific disclosed embodiments. It should also be understood that the phraseology and terminology employed above are for the purpose of disclosing the invention and the embodiments, and do not necessarily serve as limitations to the scope of the invention. Therefore, the scope of the invention is to be limited only by the following claims.

The invention claimed is:

1. A method of forming a CMC article with at least one internal cavity, the method comprising:
    coating at least one mandrel with a coating that is impervious to constituents of the CMC preform;
    wrapping ceramic composite precursor prepreg plies over the coating of the at least one mandrel, wherein each mandrel comprises silicon;
    curing the ceramic composite precursor prepreg plies into a laminate CMC preform, wherein the laminate CMC preform comprises resinous components;
    after curing, heating the laminate CMC preform and the at least one mandrel to above 500° C. to remove the resinous components to yield a porous CMC preform from the laminate CMC preform; and
    after heating, subjecting the porous CMC preform to a thermal treatment, wherein the silicon of each mandrel melts to yield molten silicon that wets the CMC preform, and is reacted with and/or absorbed into the CMC porous preform leaving behind at least one internal cavity within the CMC preform.

2. The method according to claim 1, wherein the at least one mandrel consists of silicon or a silicon alloy.

3. The method according to claim 1, wherein the thermal treatment comprises a melt-infiltration step.

4. The method according to claim 1, wherein the at least one internal cavity comprises multiple internal cavities and the at least one mandrel comprises multiple mandrels.

5. The method according to claim 1, wherein the at least one mandrel contains a material that is chemically reactive with a constituent of the CMC preform.

6. The method according to claim 1, wherein the mandrel comprises a powder silicon material.

7. The method according to claim 1, wherein the ceramic composite precursor prepreg plies are based on silicon compounds.

8. The method according to claim 7, wherein the silicon compound is SiC.

9. The method according to claim 1, wherein the at least one mandrel consists of elemental silicon.

10. The method according to claim 1, further comprising:
    after coating the at least one mandrel with the coating and prior to wrapping the ceramic composite precursor prepreg plies over the at least one mandrel, sintering the at least one mandrel.

11. The method according to claim 1, wherein the coating comprises an acrylic resin.

12. The method according to claim 1, wherein the acrylic resin is methyl methacrylate.

13. The method according to claim 1, wherein subjecting the porous CMC preform to a thermal treatment is performed within a vacuum furnace.

* * * * *